(12) United States Patent
Zlatnik

(10) Patent No.: US 9,171,102 B1
(45) Date of Patent: Oct. 27, 2015

(54) TOPOLOGICAL SORTING OF CYCLIC DIRECTED GRAPHS

(71) Applicant: Pavel Zlatnik, Prague (CZ)

(72) Inventor: Pavel Zlatnik, Prague (CZ)

(73) Assignee: CA, Inc., New York, NY (US)

( * ) Notice: Subject to any disclaimer, the term of this patent is extended or adjusted under 35 U.S.C. 154(b) by 163 days.

(21) Appl. No.: 13/773,793

(22) Filed: Feb. 22, 2013

(51) Int. Cl.
*G06F 17/30* (2006.01)

(52) U.S. Cl.
CPC ................. *G06F 17/30958* (2013.01)

(58) Field of Classification Search
CPC ............ G06F 17/30958; G06F 17/30867; G06F 17/30097
USPC .................................................... 707/798
See application file for complete search history.

(56) References Cited

U.S. PATENT DOCUMENTS

| | | | | |
|---|---|---|---|---|
| 6,077,313 A * | 6/2000 | Ruf | | 717/155 |
| 7,283,611 B1 * | 10/2007 | Luan et al. | | 378/65 |
| 7,844,113 B2 * | 11/2010 | Delong et al. | | 382/173 |

OTHER PUBLICATIONS

Kahn, A. B., "Topological Sorting of Large Networks", Communications of the ACM, Scientific and Business Applications, pp. 558-562 (1962).

* cited by examiner

*Primary Examiner* — Rehana Perveen
*Assistant Examiner* — Dongming Wang
(74) *Attorney, Agent, or Firm* — Baker Botts L.L.P.

(57) ABSTRACT

The disclosed embodiments included a system, apparatus, method, and computer program product for performing a topological sort of a directed graph that comprises a cyclic component or subcomponent. The apparatus comprises a processor configured to execute computer-readable program code embodied on a computer program product. And executing the computer-readable program code comprises identifying a plurality of vertices in a directed graph that depend upon each other in a cyclic manner and removing those vertices and all of the vertices in the same component from a topology object. The topology object then may be utilized to sort the acyclic components and/or subcomponents of the directed graph based the dependencies between the remaining vertices.

18 Claims, 12 Drawing Sheets

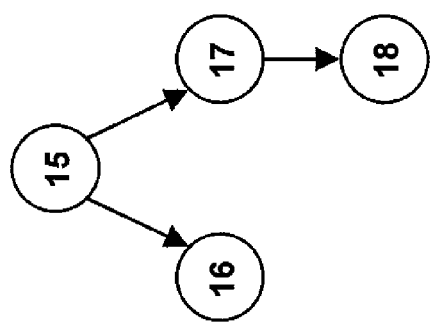
Component C
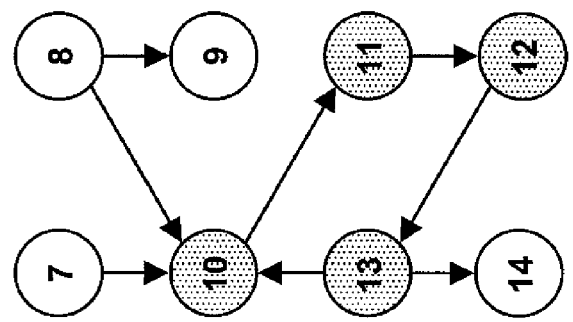
Component B
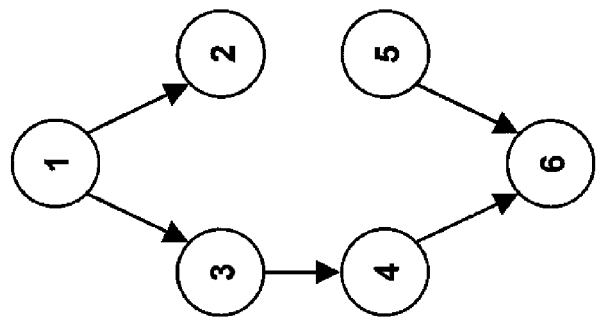
Component A
FIGURE 2

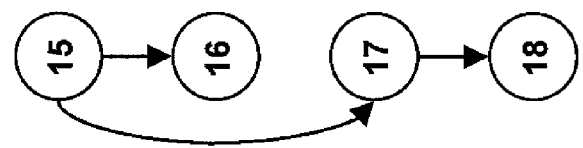
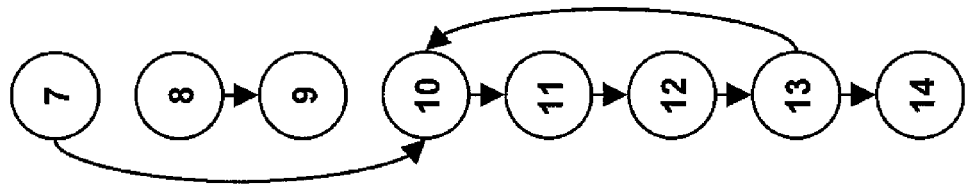
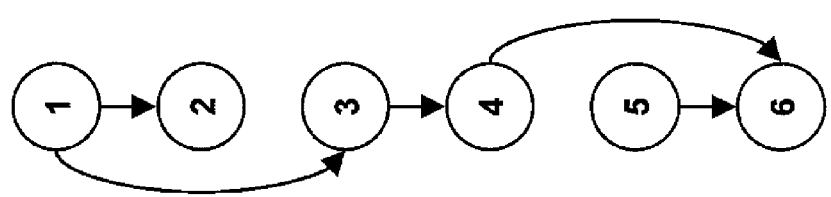
FIGURE 3A

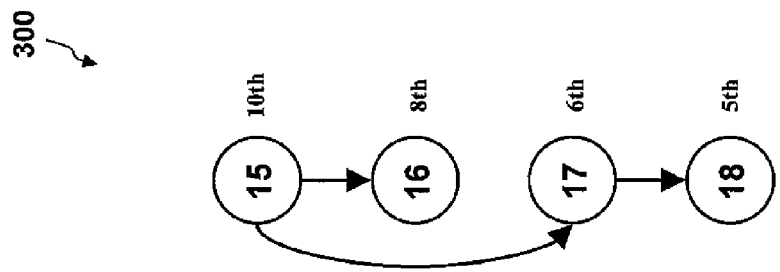
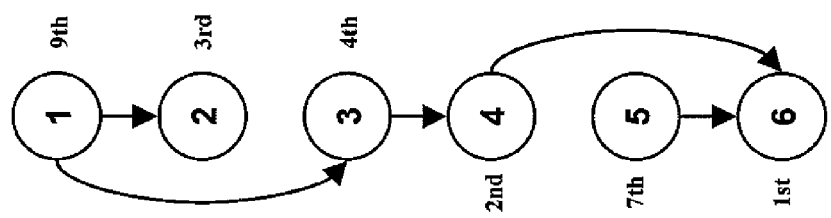
FIGURE 3C

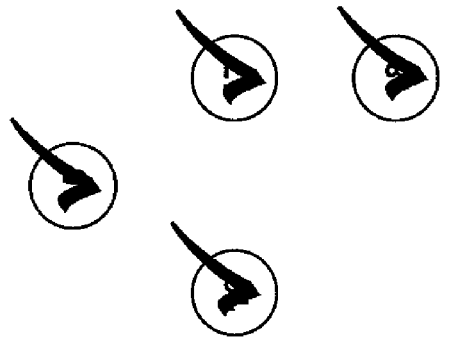
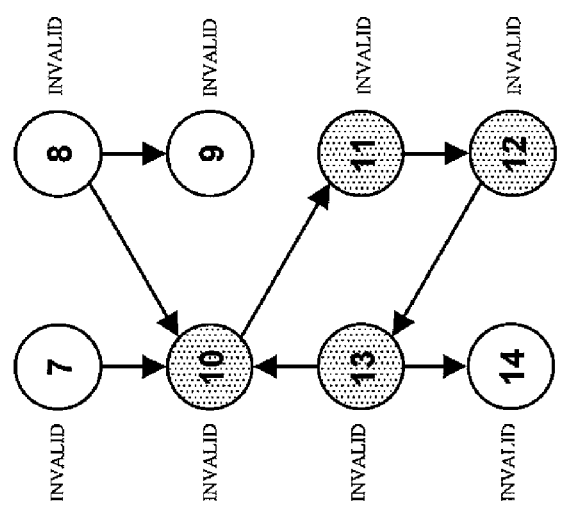
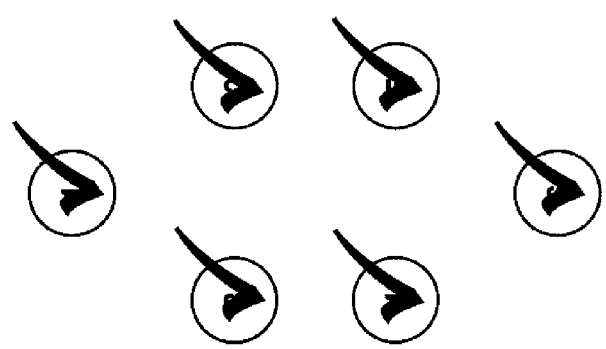
FIGURE 4C

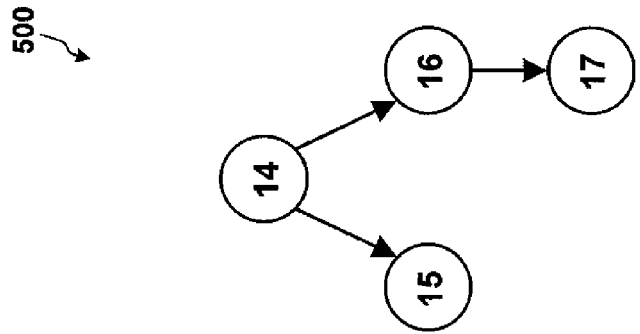
Component C
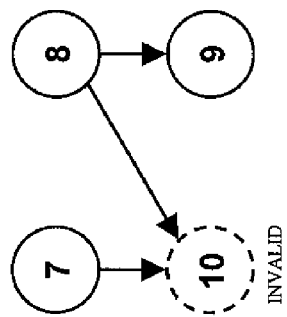
Component B
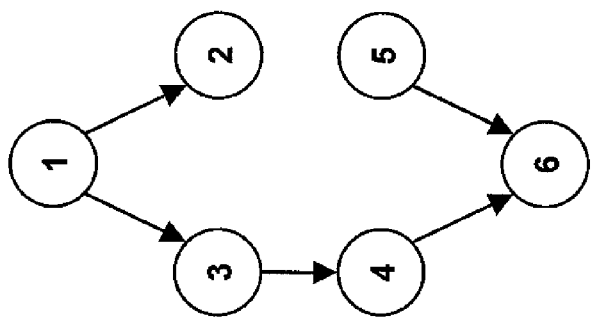
Component A
FIGURE 5A

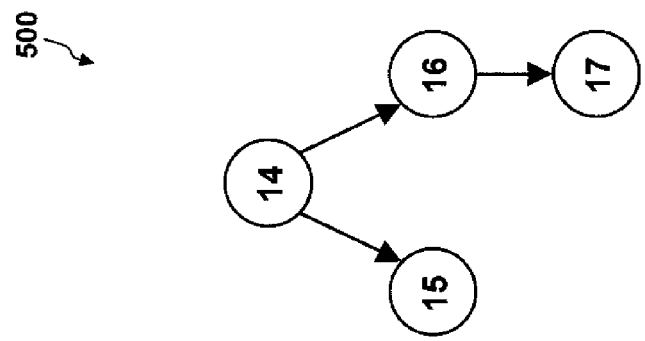
Component C
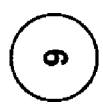
Component B
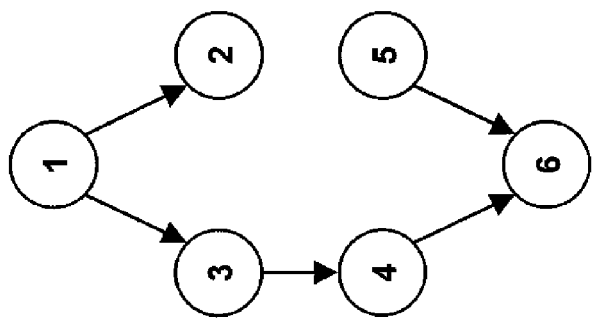
Component A
FIGURE 5B

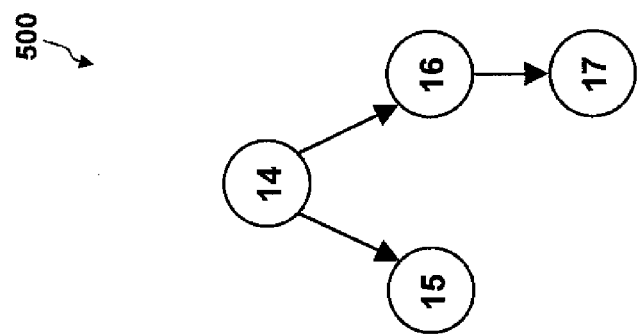
*Component C*
*Component B*
FIGURE 5C
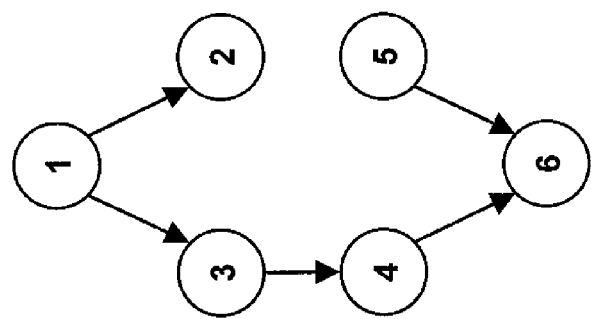
*Component A*

TOPOLOGICAL SORTING OF CYCLIC DIRECTED GRAPHS

BACKGROUND OF THE INVENTION

The present disclosure generally relates to topological sorting. The disclosed embodiments relate more specifically to a system, apparatus, method, and computer program product for performing a topological sort of a directed graph that comprises a cyclic component.

Projects that require certain tasks to be performed before others must be scheduled properly the minimize the consumption of resources and to prevent bottlenecks from occurring. When building a house, for example, the house generally must be framed before the external walls can be put in place. Accordingly, a general contractor must schedule carpenters to frame the house before masons arrive to brick up the walls so that the masons can immediately begin to work on bricking up the walls as soon as they arrive. Otherwise, the masons will have to sit by idly until the house is sufficiently framed. The same problem may arise if the general contractor has not ordered bricks and mortar by the time the masons arrive to brick up the walls of the house. Thus, it is important to schedule both tasks and resources to prevent to ensure that projects are completed in an efficient and effective manner.

A similar analogy may be applied to projects that rely on information technology (IT) to complete certain tasks. For example, poor scheduling can leave an expensive machine sitting idle while a task upon which it depends is being performed by another machine. To avoid such processing bottlenecks, such parallel processing systems may utilize an algorithm to map different tasks to different processors and to schedule the order in which those tasks are performed by those processors. Those algorithms generally perform a topological sort of those tasks based on their respective dependencies. The results of such a sort may be represented graphically by a directed graph.

A directed graph, or digraph, comprises a set of nodes, or vertices, that are connected by directional lines, or edges. Such a graph is considered "directed," rather than "undirected," because the edges have a direction associated with them that specifies the dependency of one vertex on another. For example, a first vertex that depends on a second vertex may be graphically represented in a directed graph by an edge pointing from the first vertex to the second vertex. And for the purpose of scheduling tasks, each such vertex may correspond to a particular task. For example, the first vertex may correspond to a first task that cannot begin until a second task, represented by the second vertex, is completed.

Directed graphs may in the form of a "tree" that comprises at least one "root" and at least one "leaf." A root is a vertex that has no incoming edges and every other vertex in the tree may be reached by a unique path starting at the root. By contrast, a leaf is a vertex that has no outgoing edges. In other words, a root is a vertex depends on not other vertex while all other vertices depend on the root, and a leaf is a vertex upon which no other vertex depends but that depends upon at least one other vertex. Nevertheless, a directed graph need not have a root node and there may be several or no paths from any one vertex to another.

Regardless of whether it is in the form of a tree or not, a directed graph may either be acyclic or cyclic. An acyclic directed graph comprises a plurality of vertices that are connected to each other in a sequence in which no vertex depends upon any of the vertices that depend upon that vertex, either directly or indirectly. For example, a first vertex $V_1$ may depend upon a second vertex $V_2$ and a third vertex $V_3$, and the third vertex $V_3$ may depend upon a fourth vertex $V_4$ (e.g., $V_1 \rightarrow V_2$, $V_1 \rightarrow V_3$, $V_3 \rightarrow V_4$). By contrast, a cyclic directed graph comprises a plurality of vertices that are connected to each other in a sequence in which at least one vertex depends upon one or more other vertices that depend on upon that vertex, either directly or indirectly. For example, a first vertex $V_1$ may depend upon a second vertex $V_2$, the second vertex $V_2$ may depend upon a third vertex $V_3$, and third vertex $V_3$ may depend upon the first vertex $V_1$ (e.g., $V_1 \rightarrow V_2$, $V_2 \rightarrow V_3$, $V_3 \rightarrow V_1$).

Both acyclic and acyclic directed graphs may comprise one or more connected component. A connected component comprises a plurality of vertices that are connected to each other by edges but that are not connected to one or more other vertices in the graph. For example, a directed graph may comprise a first component that comprises a first vertex $V_1$, a second vertex $V_2$, a third vertex $V_3$, and a fourth vertex $V_3$ and a second component that comprises a fifth vertex $V_5$ and a sixth vertex $V_6$. Such connected components also may comprise "strong" subcomponents in which there is a path from each vertex in the subcomponent to every other vertex in that subcomponent. For example, the foregoing first component may comprise a strong subcomponent in which the second vertex $V_2$ depends upon the third vertex $V_3$, the third vertex $V_3$ depends upon the fourth vertex $V_4$, and fourth vertex $V_4$ depends upon the second vertex $V_2$ (e.g., $V_2 \rightarrow V_3$, $V_3 \rightarrow V_4$, $V_4 \rightarrow V_2$). A strong subcomponent also may comprise a single vertex that is connected only to strong components. However, when a directed graph comprises even a single component with a cyclical, strong sub-component, conventional algorithms for performing a topological sort of that directed graph will fail.

BRIEF SUMMARY

The present disclosure is directed to system, apparatus, method, and computer program product for performing a topological sort of a directed graph that comprises a cyclic component. The apparatus comprises a processor configured to execute computer-readable program code embodied on a computer program product. And executing the computer-readable program code comprises identifying a plurality of vertices in a directed graph that depend upon each other in a cyclic manner and removing those vertices from a topology object. The apparatus may identify those vertices, for example, by (a) identifying each vertex in the directed graph that has no incoming edges, (b) removing all of the outgoing edges from each vertex that has no incoming edges, (c) repeating (a) and (b) for each vertex that has not previously been identified in (a) as having no incoming edges until no vertex is identified as having no incoming edges, and (d) identifying each vertex in the direct graph that has an incoming edge after (c) and each vertex that depends upon that vertex as being the plurality of vertices that depend upon each other in a cyclic manner. The topology object then may be utilized to sort the acyclic components of the directed graph based the dependencies between the remaining vertices.

BRIEF DESCRIPTION OF THE DRAWINGS

Aspects of the present disclosure are illustrated by way of example and are not limited by the accompanying figures with like references indicating like elements.

FIG. 2 is directed graph illustrating an example of a base map according to a non-limiting embodiment of the present disclosure;

FIGS. 3A-3C are topological graphs illustrating an example of topological objects generated based on the base map of FIG. 2;

FIGS. 4A-4C are directed graphs illustrating an example of process maps generated based on the base map of FIG. 2;

FIGS. 5A-5C are directed graphs illustrating an example of solution maps generated based on the base map of FIG. 2.

In those figures, like reference numerals refer to like parts, components, structures, and/or processes.

DETAILED DESCRIPTION

Figure 1:
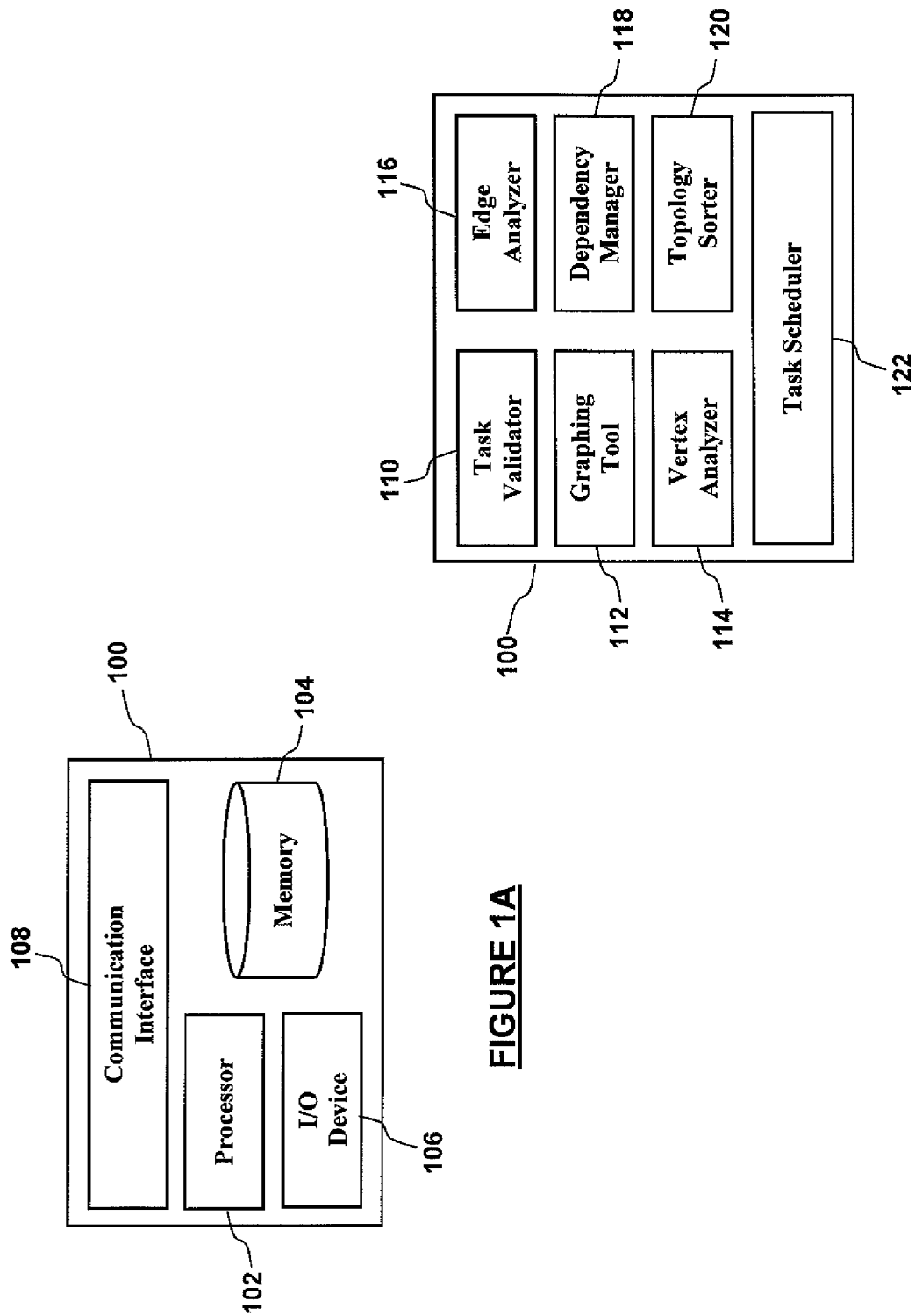
FIGS. 1A and 1B are a block diagrams illustrating an example of a topological sorting apparatus according to a non-limiting embodiment of the present disclosure.

As will be appreciated by those of ordinary skill in the art, aspects of the present disclosure may be illustrated and described herein in any of a number of patentable classes or contexts that may include any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to schematic, block, and flow diagrams of systems, methods, apparatuses, and computer program products according to embodiments of the present disclosure. It will be understood that each block of the block and flow diagrams, and combinations of blocks in the block and flow diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The system, apparatus, method, and computer program product of the disclosed embodiments provide functionality for performing a topological sort of a directed graph that may comprises any number of cyclic components. Those embodiments identify cyclic components and/or subcomponents and remove them from the directed graph so that the other components may be sorted and scheduled. Those embodiments also may identify and remove any vertices that may depend upon cyclical, strong subcomponents so that the entire component may be excluded from the topological sort.

Turning to the drawings, FIGS. 1A and 1B illustrate a topological sorting apparatus 100 according to embodiments of the present disclosure. The topological sorting apparatus 100 comprises a processor 102, a memory 104, and input/output (I/O) device 106, and a connection interface 122, as depicted in FIG. 1A. The processor 102 may comprise any number of suitable CPUs that are configured to execute computer program code embodied on the memory 104 and to perform the various functions of the topological sorting apparatus 100. The memory 104 may comprise one or more types of memory (e.g., ROM, RAM, EEPROM, etc.) as required to store the computer program code executed by the processor 102 and to support the execution of that code. The I/O device 124 may comprise any number of suitable devices that are configured to receive input from a user (e.g., a keypad, a scanner, a camera, a microphone, etc.), any number of suitable devices that are configured to output data to a user in a meaningful manner (e.g., a display, a printer, a speaker, a tactile feedback, etc.), or any combination thereof (e.g., a touch screen, a data port, etc.). And the communication interface 108 may comprise any number of suitable wired, wireless, and/or contactless interfaces that is configured to provide an data connection between the topological sorting apparatus 100 and any other device with a corresponding communication interface (e.g., a LAN connection, a wireless LAN (WLAN) connection, a WAN connection, a cellular network connection, etc.).

When utilized in combination with one or more components 102-108 of the topological sorting apparatus 100, the computer program code stored on the memory 104 of the topological sorting apparatus 100 may function as one or more modules. As depicted in FIG. 1B, for example, the topological sorting apparatus 100 also may comprise a task validator 110 that is configured to determine whether the task associated with a particular vertex may actually be scheduled; a graphing tool 112 that is configured to generate one or more directed graphs from a plurality of vertices and edges; a vertex analyzer 114 that is configured to determine whether a vertex has any edges, an edge analyzer 116 that is configured to determine an whether an edge is an input an or outgoing edge; and a dependency manager 118 that is configured to determine the dependencies between a plurality of vertices, to mark the vertices and edges in a cyclic component invalid, and to add the valid vertices and edges to a topological object. The topological sorting apparatus 100 also may comprise a topology sorter 120 that is configured to sort the topological object and a task scheduler 122 that is configured to schedule tasks at an enterprise IT solution (not shown) based on the topological sort object.

To facilitate the scheduling of tasks at the enterprise IT solution, the task scheduler 122 may connect to and communicate with the enterprise IT solution via the communication interface 108 of the topological sorting apparatus 100. The enterprise IT solution may comprise one or more resources (e.g., a processor, a virtual machine, an application, etc.) that are configured to perform various tasks (e.g., run a script, launch an executable, find and launch an application, etc.). Tasks also may be performed on those resources by other resources (e.g., update software, migrate files, scan for viruses, etc.). Such tasks may be performed by automation files that comprise, for example, executables and metadata that defines how the executables will perform a particular task, such as the security context in which a task will run. Accordingly, the task validator 110 may determine whether the task associated with a particular vertex may actually be scheduled at an enterprise IT solution by determining whether those executables and metadata will perform as desired on that enterprise IT solution. If a problem is found with the corresponding automation file, the task validator 110 will invalidate it so that it is not utilized by the other components 112-122 of the topological sorting apparatus 100 as part of the topological sort and scheduling processes.

The graphing tool 112 is configured to generate base maps 200, process maps 400, cyclic maps, and solution maps 500 based on the tasks that are determined to be valid by the task validator 110. Each of those graphs may be a directed graph that comprises vertices that represent the tasks that are to be scheduled and edges that represent the dependencies of each of those tasks on other tasks. More specifically, a base map 200 may comprise vertices that represent each of the tasks that are determined to be valid by the task validator 110 and the edges that define the interdependencies of those tasks (e.g., FIG. 2). A process map 400 may initially comprise the same vertices and edges as the base map 200 (e.g., FIG. 2), but the graphing tool 112 may remove one or more edges from that process map 400 as the vertex analyzer 114, edge analyzer 116, and dependency manager 118 analyze that map (e.g., FIGS. 4A-4C). A cyclic graph may initially comprise no vertices or edges, but the graphing tool 112 may add one or more vertices and/or edges to that map if those vertices and edges are determined to be part of a cyclic component as the vertex analyzer 114, edge analyzer 116, and dependency manager 118 analyze the process map 400. And a solution map 500 may initially comprise the same vertices and edges of the base map 200 and the process map 400 (e.g., FIG. 2), but the graphing tool 112 may remove the vertices and edges of any cyclic components from the solution map 500 as the vertex analyzer 114, edge analyzer 116, and dependency manager 118 analyze the base map 200 and the process map 400 (e.g., FIGS. 5A-5C). Accordingly, a base map 200 represents all of the tasks that require scheduling; a process map 400 represents the base map 200 as it is being processed; a cyclic map represents the strong, cyclic components of the base map 200; and a solution map 500 represents the acyclic components of the base map 200 that can be processed by the topology sorter 120 and provided to the task scheduler 122 for scheduling.

The vertex analyzer 114, edge analyzer 116, and dependency manager 118 may analyze the base map 200 and the process map 400 utilizing an algorithm that is configured to identify and the cyclic vertices in the process map 400 and mark them invalid, to identify any vertices that depend on those cyclic vertices and mark them invalid, and to remove each of those invalid vertices and their corresponding edges from the solution map 500. A non-limiting example of such an algorithm is provided below, wherein Base_Map corresponds to the base map 200, Process_Map corresponds to the process map 400, Cyclic_Map corresponds to the cyclic map, Solution_Map corresponds to the solution map 500, Changed_Vertices_Flag indicates whether Vertex flag has changed, Cycle indicates whether cyclic vertices have been identified, S identifies a set of vertices with no incoming edges, and L identifies a list of the vertices that have been topologically sorted in the reverse order (i.e., from roots to leaves), and "Get Ordered Vertices from Topology Object" retrieves that list L so it may schedule and calculate child vertices before parent vertices:

Fill Process_Map and Solution_Map with_Vertices from Base_Map
Set Cycle = True
While Cycle = True and Solution_Map ≠ Empty

```
Clear Topology Object (clear internal maps)
For each Vertex in Process_Map that is Valid
    Add that Vertex to Topology Object
Set Changed_Vertices_Flag = False
For each Solution_Vertex from Base_Map
    If Solution_Vertex = Valid
        If Solution_Vertex has one or more outgoing Edges
            For each outgoing Edge
                If Process_Map contains Solution_Vertex and Solution_Outgoingedge_Vertex
                    If Solution_Vertex = Valid and Solution_Outgoingedge_Vertex = Valid
                        Add Edge to Topology Object
                    Else
                        If Solution_Outgoingedge_Vertex = Invalid
                            Set Solution_Vertex = Invalid
                            Remove Solution_Vertex from Topology Object
                            If Solution_Vertex is in Solution_Map
                                Remove Solution_Vertex from Solution_Map
                                Set Changed_Vertices_Flag = True
                Else
                    If Process_Map doesn't contain Solution_Outgoingedge_Vertex
                        Set in Process_Map Solution_Vertex = Invalid
                        Remove Solution_Vertex from Topology Object
                        If Solution_Vertex is in Solution_Map
                            Remove Solution_Vertex from Solution_Map
                            Set Changed_Vertices_Flag = True
    Else
        Set Solution_Vertex in Process_Map = Invalid
        Remove Solution_Vertex from Topology Object
        If Solution_Vertex is in Solution_Map
            Remove Solution_Vertex from Solution_Map
            Set Changed_Vertices_Flag = True
For each Valid Vertex n in Process_Map with no incoming Edge
    Add that Vertex n to S
While S ≠ Empty
    Remove Vertex n from S
    Insert Vertex n into L
    For each Vertex m with an Edge e from n to m
        Remove Edge e from Process_Map
        If Vertex m has no other incoming Edges
            Insert Vertex m into S
    For each Vertex from Process_Map
        If any Vertex has incoming Edge
            Set Cycle = True
If Cycle = True
    Move Vertices and outgoing Edges from Solution_Map to Cyclic_Map
    For each Vertex in Cyclic_Map
        If Vertex has incoming Edge
            If Vertex is in Process_Map
                Set Vertex = Invalid
            If Solution_Map contains Vertex
                Remove that Vertex from Solution_Map
    If Changed_Vertices_Flag = True
        Set Cycle = True
        Set Changed_Vertices_Flag = False
    If Solution_Map is empty
        Set cycle = False
If Cycle = False
    Get ordered Vertices from Topology Object
```

Figure 3B:
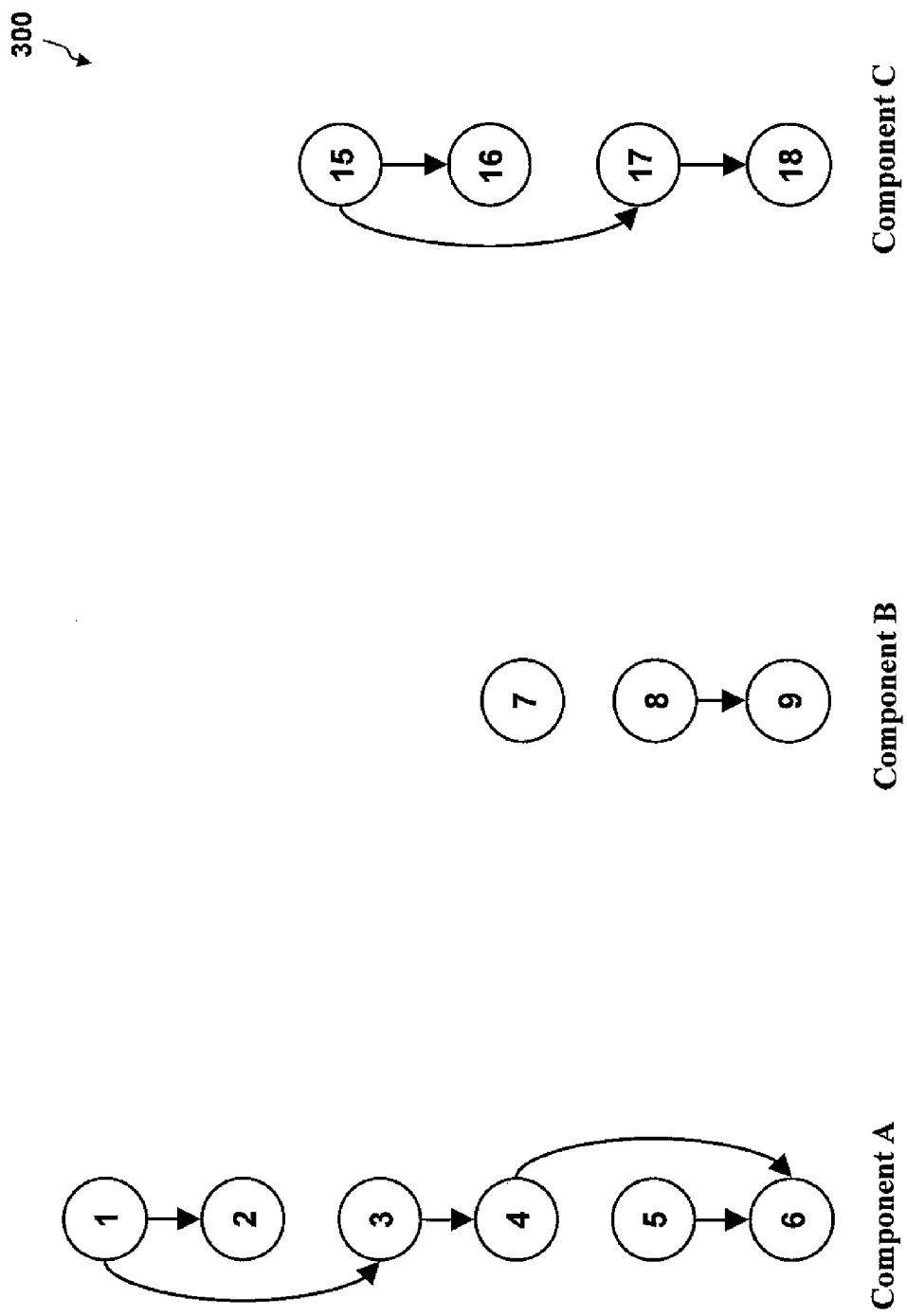

An example of how that algorithm is executed is provided below with respect to the topological sorting apparatus 100 depicted in FIGS. 1A and 1B; the directed graphs 200, 400, and 500 depicted in FIGS. 2, 4A-4C, and 5A-3C; the topology object 300 depicted in FIGS. 3A-3C, and the sorting and scheduling process 600 depicted in FIG. 6.

At step 602 of the sorting and scheduling process 600, the tasks that need to be performed are identified. Those tasks may be identified, for example, utilizing the I/O device 106 of the topological sorting apparatus 100. Each of those tasks may have a corresponding automation file that is configured to perform the underlying task at or on one or more resources at a target enterprise IT solution. Then, at step 604, the task validator 110 identifies any inoperable automation files, such as those that may cause errors in the target enterprise IT solution if that enterprise IT solution attempts to perform the tasks defined by those automation files.

At step 606, the graphing tool 112 generates a base map 200 that comprises a vertex for each of the tasks that is determined to be operable at step 604, together with the edges that define the dependencies between those tasks. The graphing tool 112 may determine whether to apply an edge and which type of edge to apply (i.e., incoming or outgoing) to each vertex based on metadata in the automation file for the corresponding task, which may identify the dependencies of that task. The graphing tool 112 also generates a process map 400 and a solution map 500 at step 606, each of which initially includes all of the same vertices and edges of the base map 200. As depicted in FIG. 2, for example, a directed graph with three (3) separate connected components is generated as the base map 200, the initial process map 400, and the initial solution map 500. Each of the vertices in each of those maps 200, 300, and 400 has a status of "valid" when those maps are initially generated by the graphing tool 112 at step 606.

At step 608, the topology sorter 120 adds each of the valid vertices from the process map 400 to a topology object 300 that may be utilized by the task scheduler 122 to schedule the underlying tasks. And at step 610, the dependency manager 118 determines whether each of the vertices added to the topology object 300 at step 608 depends upon one or more invalid vertices. The dependency manager 118 makes that determination by analyzing the vertices and edges in the base map 200 and/or the process map 400. Unlike the other maps generated by the graphing tool 112 at step 606, the base map 200 contains all of the vertices and edges for all of the tasks to be performed. And although edges may be removed from the process map 400 at step 618, the process map 400 may be refreshed to include all of those edges again each time step 610 is performed, except that the process map 400 still may identify any vertices whose status was changed to "invalid" at step 624. Accordingly, the dependency manager 118 may utilize either the base map 200 or the process map 400 to determine whether a particular vertex has one or more outgoing edges, and the dependency manager 118 may utilize the process map 400 to determine whether a particular vertex depends upon an invalid vertex.

If the dependency manager 118 determines at step 610 that a particular vertex has at least one outgoing edge connecting it to an invalid vertex (i.e., Step 610=Yes), the dependency manager 118 removes that vertex from the topology object 300 at step 612. Also at step 612, the graphing tool 112 removes that vertex from the solution map 500. And if the dependency manager 118 determines at step 610 that a particular vertex has no outgoing edges that connect it to an invalid vertex (i.e., Step 610=No), the dependency manager 118 adds the outgoing edge(s) for that vertex to the topology object 300 at step 614. Accordingly, steps 610-614 may be repeated for each valid vertex in the topology object 300 until all of the vertices with invalid dependencies are removed from the topology object 300 and all of the outgoing edges for the remaining vertices are added to the topology object 300.

Because the default status of all of the vertices in the solution map 400 is valid when that map is initially generated by the graphing tool 112 at step 606, all of the vertices and edges from that map will be added to the topology object 300 the first time step 608 is performed, as depicted in FIG. 3A. Step 608 may be performed again, however, if any vertices remain in the process map 400 after steps 616 and 618. And if step 608 is performed again, at least some of the vertices that were added to the topology object 300 the first time step 608 was performed will have had their status changed to "invalid". Accordingly, the topology object 300 may be cleared before step 608 is performed so that fewer vertices may be added to the topology object 300 each time step 608 is performed.

Figure 4A:
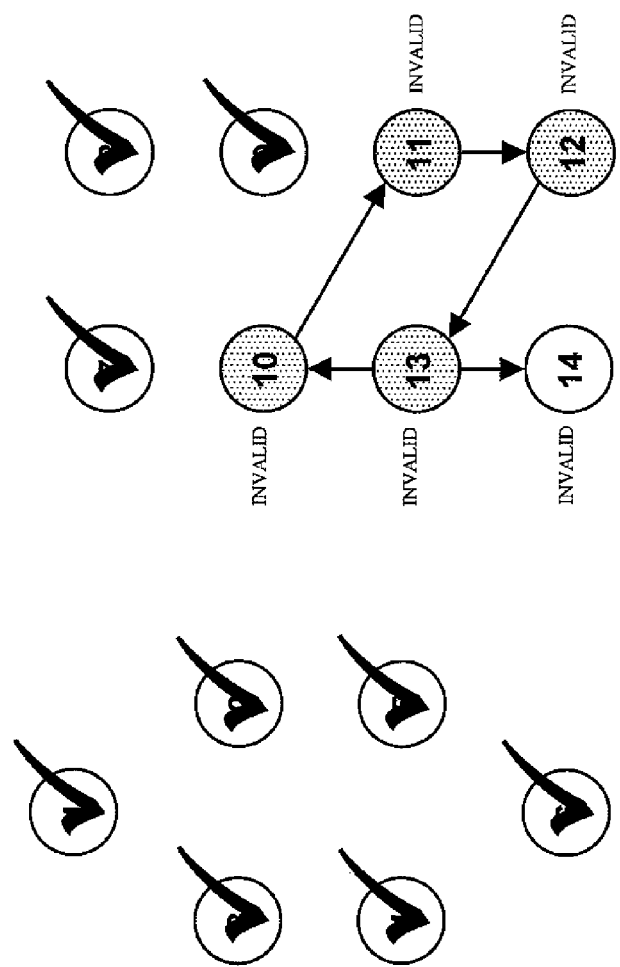

At step 616, the vertex analyzer 114 and the edge analyzer 116 randomly determine which vertices have no incoming edges. The topology sorter 120 adds those vertices to a set S of vertices identified as having no incoming edges, which may initially be empty. As depicted in FIG. 4A, for example, vertices $V_1$, $V_5$, $V_7$, $V_8$, and $V_{14}$ may be identified, in any order, as having no incoming edges and, therefore, added to the set S of identified vertices. The topology sorter 120 then may move those vertices from the set S of identified vertices to a list L of vertices that have been processed, one at time, as the graphing tool 112 removes the outgoing edges of the corresponding vertex from the solution map 400 at step 618. Accordingly, each vertex in the set S will be processed one time as steps 616 and 618 are repeated.

Steps 616 and 618 may be repeated until no vertices in the process map 400 are identified as having no incoming edges (i.e., until the set S of identified vertices is empty). As depicted in FIG. 4A, for example, after the topology sorter 120 moves vertices $V_1$, $V_5$, $V_7$, $V_8$, and $V_{14}$ to the set S, the graphing tool 112 may randomly select one of those vertices (e.g., $V_{14}$) and remove its outgoing edges from the process map 400. The topology sorter 120 then may move that vertex from the set S of identified vertices to the list L of processed vertices. And when removing the outgoing edges from an identified vertex (e.g., $V_{14}$) at step 618 results in any other vertices (e.g., $V_{15}$ and $V_{16}$) having no incoming edges, those vertices may be identified by the vertex analyzer 114 and the edge analyzer 116 and added to the set S of identified vertices by the topology sorter 120 by repeating step 616.

After any additional vertices are added to the set S of identified vertices at step 616, the topology sorter 120 may randomly select another vertex (e.g., $V_{15}$) from the updated set S of identified vertices (e.g., $V_1$, $V_5$, $V_7$, $V_8$, $V_{15}$, and $V_{16}$) at step 618, and the graphing tool 112 may remove the outgoing edges of that vertex from the process map 400 at step 618 before the topology sorter 120 moves that vertex from the set S of identified vertices to the list L of processed vertices. Accordingly, steps 616 and 618 can be repeated on a random selection of vertices (e.g., $V_5$, $V_1$, $V_{16}$, $V_{17}$, $V_3$, $V_7$, $V_4$, $V_8$, $V_9$, $V_6$, $V_2$), as the set S of identified vertices is updated, until no vertices are identified as having no incoming edges (i.e., until the set S of identified vertices is empty). Such random selection of vertices results in the process map 400 being traversed randomly, rather than depth first or breadth first.

As depicted in FIG. 4A, for example, vertices $V_1$-$V_6$, $V_7$-$V_9$, and $V_{14}$-$V_{17}$ are processed at steps 616 and 618 before the sorting and scheduling process 600 proceeds to step 620. At step 620, the vertex analyzer 114 and the edge analyzer 116 determine whether any of the vertices in the process map 400 have one or more incoming edges after all of the vertices in the set S of identified vertices have been processed (i.e., after all of the vertices in set S have been moved to list L). If the vertex analyzer 114 and the edge analyzer 116 determine at step 620 that one or more of the vertices in the process map 400 have one or more incoming edges (i.e., Step 620=Yes), then at step 622 the topology sorter 120 determines that the corresponding component of the base map 200 is cyclic. And if the base map 200 comprises a cyclic component, the graphing tool 112 moves each of the vertices that has not been processed (i.e., each of the vertices not in the list L of processed vertices), together with their corresponding edges, from the solution map 500 to the cyclic map. As a result, the solution map 500 will comprise all of the vertices and edges of the base map 200, except for the cyclic, strong subcomponent (e.g., $V_{10}$-$V_{13}$) and any vertices upon which that cyclic, strong subcomponent depend (e.g., $V_{14}$), as depicted in FIG. 5A.

Figure 4B:
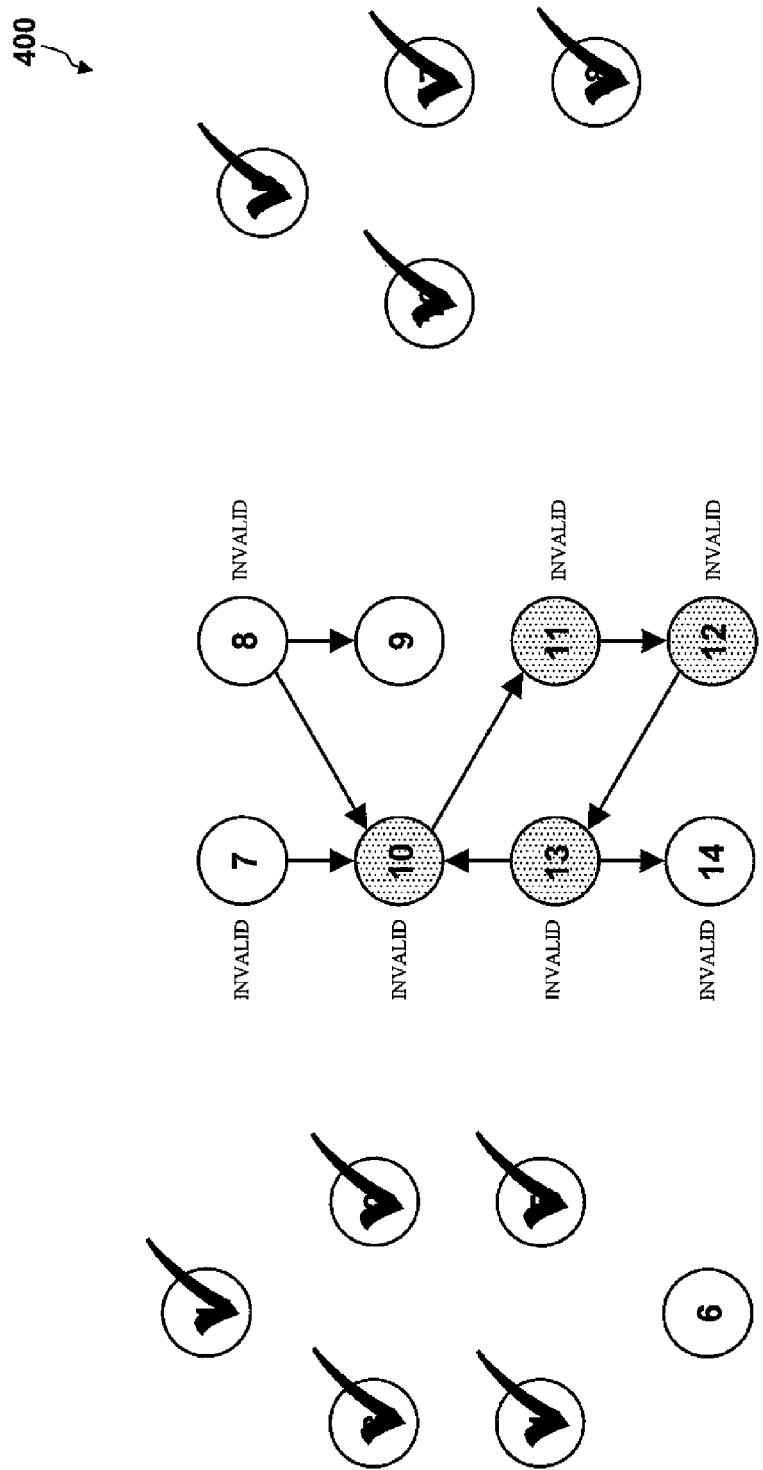

At step 624, the dependency manager 118 changes the status of each of the vertices of the cyclic, strong subcomponent (e.g., $V_{10}$-$V_{13}$) and the vertices upon which that cyclic, strong subcomponent depend (e.g., $V_{14}$) to "invalid", as depicted in FIG. 4A. Thereafter, step 608 may be repeated utilizing only the vertices whose status remains set to "valid". As depicted in FIG. 3B, for example, vertices $V_1$-$V_6$, $V_7$-$V_9$, and $V_{14}$-$V_{17}$ and their respective outgoing edges are added to the topology object 300 when step 608 is repeated a second time because each of those vertices remained valid after the first pass through the sorting and scheduling process 600. And when steps 610-614 are repeated for those vertices, the dependency manager 118 changes the status of vertices $V_7$ and $V_8$ to "invalid" at step 612 due to their dependency on invalid vertex $V_{10}$, as depicted in FIGS. 4B and 5A. Vertices $V_7$ and $V_8$ also are removed from the solution map 500 at step 612 when steps 610-614, as depicted in FIG. 5B. Nevertheless, and as also depicted in FIG. 5B, vertex $V_9$ remains valid and part of the solution map 500 when steps 610-614 are repeated because it has no dependencies (i.e., no outgoing edges).

Although vertex $V_9$ remains valid and part of the solution map 500 when steps 610-614 are repeated, the dependency manager 118 changes the status of vertex $V_9$ to "invalid" at step 624 when steps 616-624 are repeated because those steps are performed only on valid vertices. Accordingly, vertex $V_9$ and its incoming edge will remain after all of the other valid vertices have been processed at steps 616 and 618. Vertex $V_9$ then is identified as cyclic at step 620 and, therefore, invalid, as depicted in FIG. 4C. Also when steps 616-624 are repeated, vertex $V_9$ will be removed from the solution map 500 based on its incoming edge at step 622, as depicted in FIG. 5C. Steps 608-624 then may be repeated one more time to generate a topology object 300 that includes only the remaining, valid vertices and their corresponding edges, as depicted in FIG. 3C.

Steps 608-624 may be repeated in the foregoing manner for any number of vertices that make up any number of components. Moreover, steps 608-624 may be repeated in the foregoing manner for any number cyclic components. Those steps are repeated until the vertex analyzer 114 and the edge analyzer 116 determine at step 620 that all of the valid vertices in the process map 400 have been processed (i.e., all of the vertices in set S have been moved to list L) and none of the remaining vertices has any incoming edges. When that condition is satisfied (i.e., Step 620=Yes), the topology manager 120 may perform a complete sort of the valid vertices in the topological object 300. As depicted in FIG. 3C, for example, the vertices $V_1$-$V_6$ and $V_{14}$-$V_{17}$ are sorted 1st-12th such that every vertex points to (i.e., depends upon) a lower numbered vertex. Accordingly, the vertex analyzer 114, edge analyzer 116, and topology sorter 120 may work together to both identify cyclic components and sort the acyclic components.

After all of the acyclic components of the base map 200 have been sorted (i.e., Step 620=No), the task scheduler 122 utilizes the sorted topology object 300 to schedule the underlying tasks at an enterprise IT solution at step 626. The sorting performed by the topology sorter 120 ensures that tasks are performed in the proper order so that no bottleneck occurs and resources are utilized in an effective and efficient manner at the enterprise IT solution. By removing the cyclic components from a directed graph before scheduling the underlying tasks, the task scheduler 122 may sort and schedule at least the acyclic components of a directed graph, whereas conventional algorithms may have failed to sort or schedule any tasks due to the presence of a cyclic, strong subcomponent in any one of the components of the directed graph.

Although depicted as part of the topological sorting apparatus 100 in FIG. 1, it should be understood that the task scheduler 122 also may be provided as part of some other apparatus. For example, the task scheduler 122 may be provided as part of the enterprise IT solution and it may receive the topological object 300 from the topology sorter 120 via the communication interface 108 of the topological sorting apparatus 100. It also should be understood that other modules of the topological sorting apparatus 100 may be provided as part of one or more other apparatuses in a similar manner.

Figure 6:
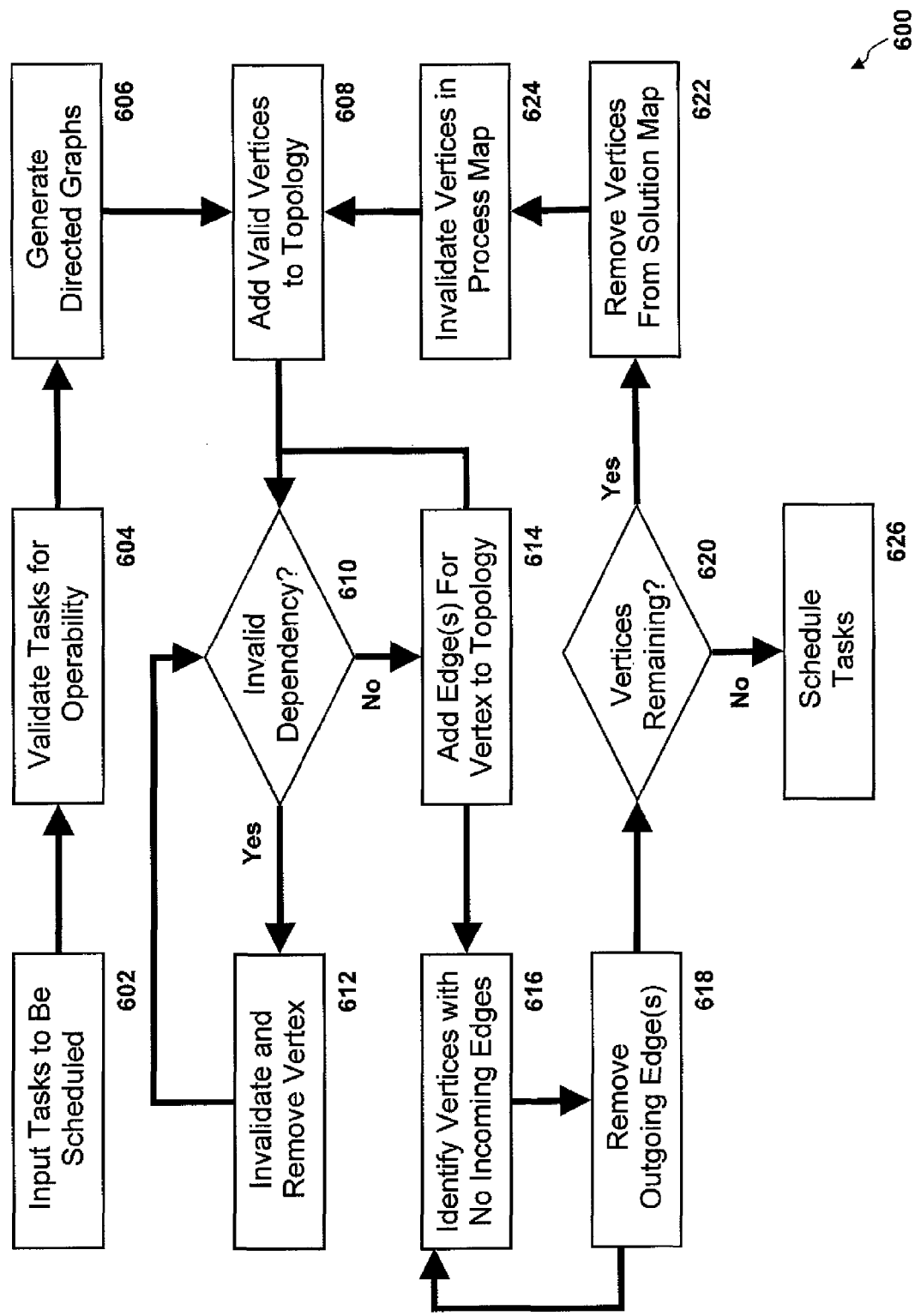
FIG. 6 is a flow diagram illustrating an example of a topological sorting and scheduling process according to a non-limiting embodiment of the present disclosure.

The block and flow diagrams in FIGS. 1A, 1B, and 6 illustrate the architecture, functionality, and operation of possible implementations of systems, methods, apparatuses, and computer program products according to various aspects of the present disclosure. In that regard, each block in those diagrams may represent a module, segment, or portion of code, which comprises one or more executable instructions for implementing the specified logical function(s). It should also be noted that, in some alternative implementations, the functions noted in a block of the flow diagram may occur out of the order noted in FIG. 6. For example, two blocks shown in succession may, in fact, be executed substantially concurrently, or the blocks may sometimes be executed in the reverse order, depending upon the functionality involved. It will also be noted that each block of the block and flow diagrams, and combinations of blocks in the block and flow diagrams, can be implemented by special purpose hardware-based systems that perform the specified functions or acts, or combinations of special purpose hardware and computer instructions.

The terminology used herein is for the purpose of describing particular aspects of the disclosed embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The descriptions of the system, method, apparatus, and computer program product of the present disclosure have been presented for purposes of illustration, but are not intended to be exhaustive or to limit the system, method, apparatus, and computer program product to the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. An apparatus comprising a processor and computer-readable program code stored on a memory, to, when executed by the processor:
   identify a plurality of vertices in a directed graph within a topology object that depend upon each other in a cyclic manner, the topology object defining an order for scheduling tasks in an IT system, the identifying comprising:
   recurrently removing all outgoing edges from each vertex in the directed graph having no incoming edges until a determination is made that each remaining vertex has an incoming edge; and
   identifying said each remaining vertex and any vertex which depends upon said each remaining vertex as being the plurality of vertices that depend upon each other in a cyclic manner, wherein each vertex in the directed graph corresponds to a particular task in the IT system;
   remove the plurality of vertices from the topology object to exclude each corresponding task from being scheduled, the topology object being configured to be sorted based on dependencies between different vertices; and
   schedule tasks corresponding to said each remaining vertex in the topology object for execution on the IT system.

2. The apparatus of claim 1, wherein the computer-readable program code is further configured to:
  identify each other vertex in the directed graph that depends upon a vertex from among the plurality of vertices that depend upon each other in a cyclic manner; and
  remove each other vertex from the topology object.

3. The apparatus of claim 2, wherein:
  executing the computer-readable program code further comprises generating a process map that comprises each vertex and each edge of the directed graph;
  removing all outgoing edges from each vertex having no incoming edges comprises removing outgoing edges from a vertex in the process map;
  identifying said each remaining vertex and any vertex which depends upon said each remaining vertex comprises marking a plurality of vertices in the process map as invalid; and
  identifying each other vertex in the directed graph that is context to a vertex from among the plurality of vertices that depend upon each other in a cyclic manner comprises marking another vertex in the process map as invalid.

4. The apparatus of claim 3, wherein the computer-readable program code is further configured to:
  generate a solution map that comprises each vertex and each edge of the directed graph;
  remove from the solution map said each remaining vertex and any vertex which depends upon said each remaining vertex; and
  remove from the solution map each outgoing edge for each vertex that is removed from the solution map.

5. The apparatus of claim 4, wherein the computer-readable program code is further configured to remove from the topology object each vertex that is removed from the solution map.

6. The apparatus of claim 5, wherein the computer-readable program code is further configured to add to the topology object each corresponding edge for each vertex that remains in the topology object, after each vertex that is removed from the solution map is removed from the topology object.

7. A method comprising:
  identifying a plurality of vertices in a directed graph within a topology object that depend upon each other in a cyclic manner, the topology object defining an order for scheduling tasks in an IT system, the identifying comprising:
    recurrently removing all outgoing edges from each vertex in the directed graph having no incoming edges until a determination is made that each remaining vertex has an incoming edge; and
    identifying said each remaining vertex and any vertex which depends upon said each remaining vertex as being the plurality of vertices that depend upon each other in a cyclic manner, wherein each vertex in the directed graph corresponds to a particular task in the IT system;
  removing the plurality of vertices from the topology object to exclude each corresponding task from being scheduled, the topology object being configured to be sorted based on dependencies between different vertices; and
  scheduling tasks corresponding to said each remaining vertex in the topology object for execution on the IT system.

8. The method of claim 7, further comprising:
  identifying each other vertex in the directed graph that is context to a vertex from among the plurality of vertices that depend upon each other in a cyclic manner; and
  removing each other vertex from the topology object.

9. The method of claim 8, further comprising generating a process map that comprises each vertex and each edge of the directed graph, wherein:
  removing all outgoing edges from each vertex having no incoming edges comprises removing outgoing edges from a vertex in the process map;
  identifying said each remaining vertex and any vertex which depends upon said each remaining vertex comprises marking a plurality of vertices in the process map as invalid; and
  identifying each other vertex in the directed graph that depends from a vertex from among the plurality of vertices that depend upon each other in a cyclic manner comprises marking another vertex in the process map as invalid.

10. The method of claim 9, further comprising:
  generating a solution map that comprises each vertex and each edge of the directed graph;
  removing from the solution map said each remaining vertex and any vertex which depends upon said each remaining vertex; and
  removing from the solution map each outgoing edge for each vertex that is removed from the solution map.

11. The method of claim 10, further comprising removing from the topology object each vertex that is removed from the solution map.

12. The method of claim 11, further comprising adding to the topology object each corresponding edge for each vertex that remains in the topology object, after each vertex that is removed from the solution map is removed from the topology object.

13. A computer program product comprising a computer readable storage medium having embodied therewith computer readable program code to be executed by a processor, the computer readable program code comprising:
  computer-readable program code configured to identify a plurality of vertices in a directed graph within a topology object that depend upon each other in a cyclic manner, the topology object defining an order for scheduling tasks in an IT system, the identifying comprising:
    recurrently removing all outgoing edges from each vertex in the directed graph having no incoming edges until a determination is made that each remaining vertex has an incoming edge; and
    identifying said each remaining vertex and any vertex which depends upon said each remaining vertex as being the plurality of vertices that depend upon each other in a cyclic manner, wherein each vertex in the directed graph corresponds to a particular task in the IT system;
  computer-readable program code configured to remove the plurality of vertices from the topology object to exclude each corresponding task from being scheduled, the topology object being configured to be sorted based on dependencies between different vertices; and
  scheduling tasks corresponding to said each remaining vertex in the topology object for execution on the IT system.

14. The computer program product of claim 13, further comprising:
  computer-readable program code configured to identify each other vertex in the directed graph that depends upon a vertex from among the plurality of vertices that depend upon each other in a cyclic manner; and
  computer-readable program code configured to remove each other vertex from the topology object.

15. The computer program product of claim 14, further comprising computer-readable program code configured to generate a process map that comprises each vertex and each edge of the directed graph, wherein:
  removing all outgoing edges from each vertex having no incoming edges comprises removing outgoing edges from a vertex in the process map;
  identifying said each remaining vertex and any vertex which depends upon said each remaining vertex comprises marking a plurality of vertices in the process map as invalid; and
  identifying each other vertex in the directed graph that is context to a vertex from among the plurality of vertices that depend upon each other in a cyclic manner comprises marking another vertex in the process map as invalid.

16. The computer program product of claim 15, further comprising:
  computer-readable program code configured to generate a solution map that comprises each vertex and each edge of the directed graph;
  computer-readable program code configured to remove from the solution map said each remaining vertex and any vertex which depends upon said each remaining vertex; and
  computer-readable program code configured to remove from the solution map each outgoing edge for each vertex that is removed from the solution map.

17. The computer program product of claim 16, further comprising computer-readable program code configured to remove from the topology object each vertex that is removed from the solution map.

18. The computer program product of claim 17, further comprising computer-readable program code configured to add to the topology object each corresponding edge for each vertex that remains in the topology object, after each vertex that is removed from the solution map is removed from the topology object.

* * * * *